Sept. 16, 1947.  R. GOUIRAND  2,427,598
APPARATUS FOR TRANSMITTING POWER
Filed May 18, 1943  3 Sheets-Sheet 1
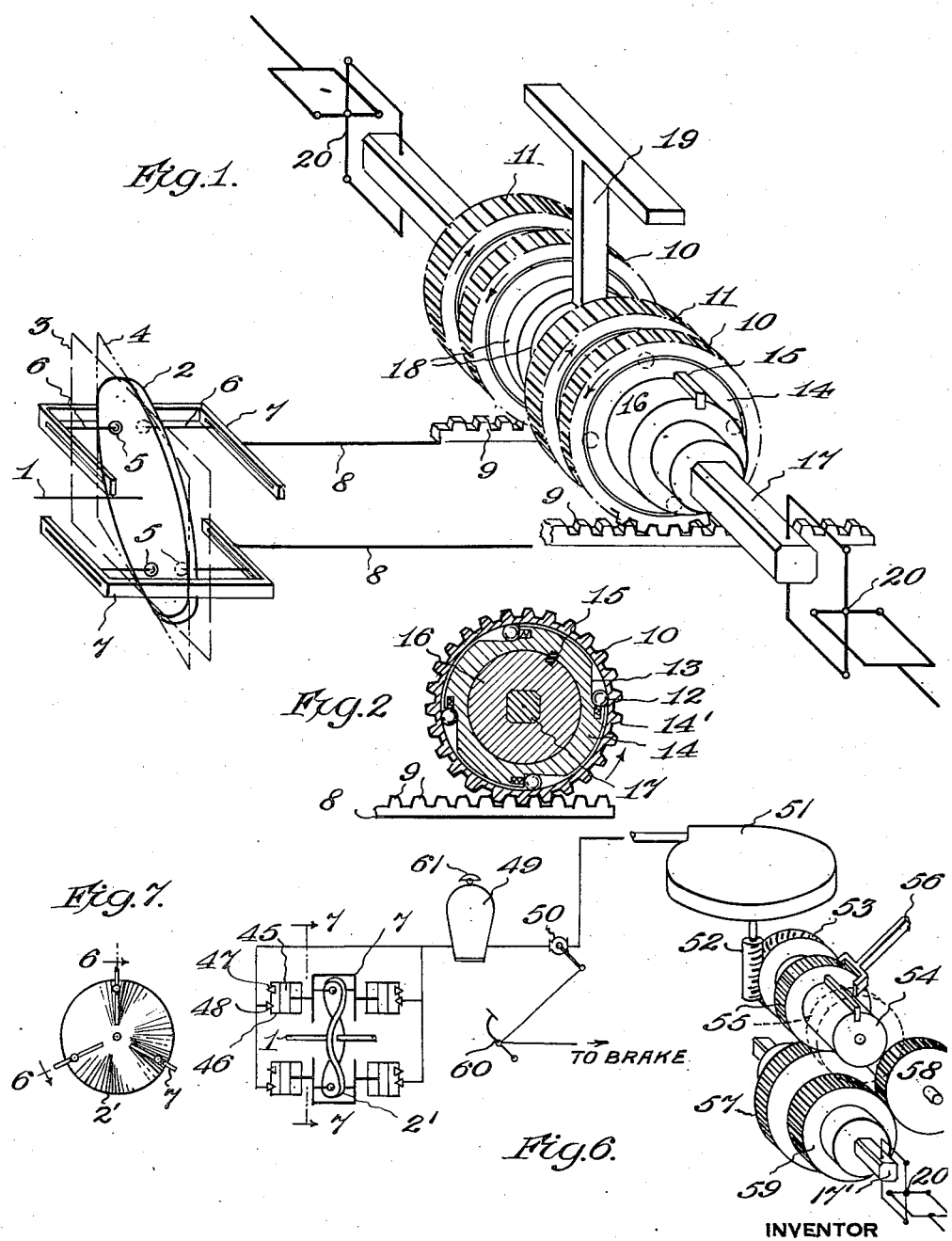
INVENTOR
RENE GOUIRAND
BY
ATTORNEY

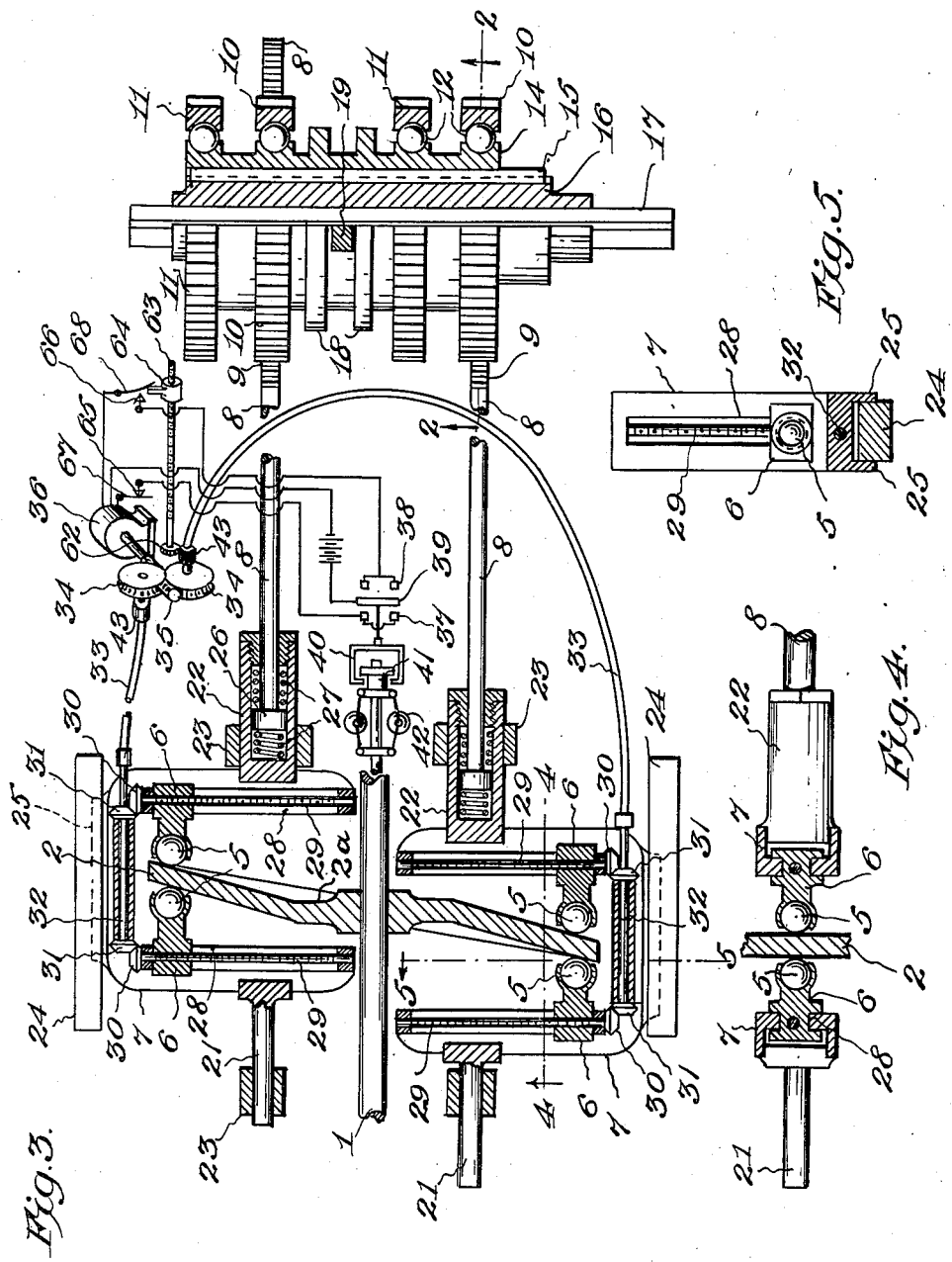

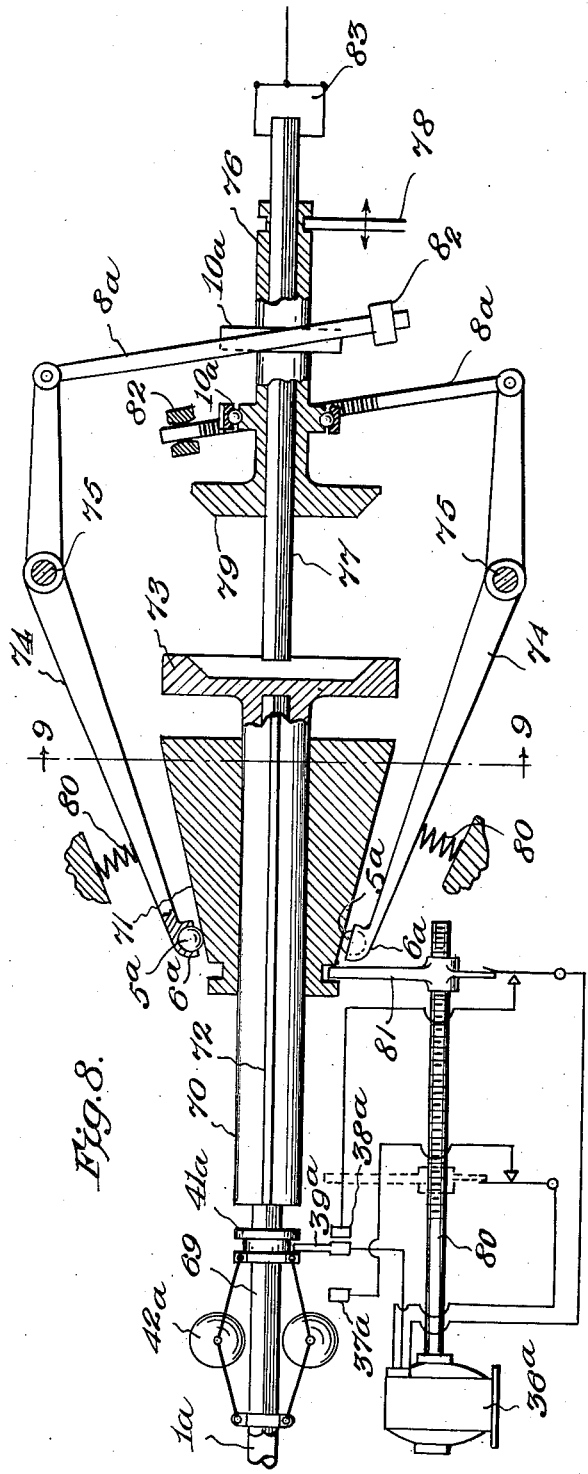

Patented Sept. 16, 1947

2,427,598

UNITED STATES PATENT OFFICE 2,427,598

APPARATUS FOR TRANSMITTING POWER

Rene Gouirand, New York, N. Y.

Application May 18, 1943, Serial No. 487,460

3 Claims. (Cl. 74—114)

This invention relates to a method of transmitting power and apparatus for carrying out such method.

The object of the invention is to eliminate the heavy and cumbersome gear shift mechanisms heretofore commonly in vogue, particularly in motor vehicle transmissions, and to substitute therefor a simple and efficient apparatus wherein a cam faced disk or cone, driven by an appropriate prime mover, such as the internal combustion engine of the vehicle, is adapted to be rotated or gyrated for the purpose of translating the rotary movement of the crank shaft into reciprocating movement, and this reciprocating movement is utilized to propel one or more driven shafts, as desired.

Speaking generally, the cam faced disk or cone, when rotating or gyrating with the shaft on which it is mounted, is adapted to act upon followers which may be moved radially of the disk or cone to vary the throw of the followers and thus vary the transmitted power in accordance with the load requirements. The followers are moved radially of the disk or cone to suit requirements of speed and leverage in accordance with the load, and while this may be accomplished manually, it is preferably automatically controlled either mechanically or electrically.

The followers are adapted to actuate power transmitting mechanism connected to a driven shaft or shafts which, in the event that the invention is employed for the propulsion of a motor vehicle, may constitute the rear axle shafts of such vehicle. Provision is made, as hereinafter more fully described, for driving the driven shaft or shafts in either direction to obtain a "forward" drive of the vehicles or a "reverse" drive, as well as an intermediate "neutral," according to the will of the operator.

The invention embodies numerous novel features which will be presently explained in detail and provides for a positive drive either through mechanical, electrical or fluid connections between the followers and the driven shaft as may be desired.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 shows diagrammatically in perspective one form of transmission system of the present invention.

Figure 2 is a sectional view taken on the line 2—2 of Figure 3 through a ball ratchet arrangement which I employ in the particular form of apparatus shown in Figure 1.

Figure 3 is a plan view of the operating parts of the apparatus shown diagrammatically in Figure 1 with certain parts shown in section in the interest of clearness.

Figure 4 is a section on the line 4—4 of Figure 3.

Figure 5 is a section on the line 5—5 of Figure 3.

Figure 6 illustrates diagrammatically a modified form of transmission system embodying this invention wherein, in contradistinction to the purely mechanical drive of Figure 1, the drive of Figure 6 is pneumatic in part.

Figure 7 is a face view of the modified form of cam disk shown in Figure 6, Figure 7 being in effect a section on the line 7—7 of Figure 6.

Figure 8 shows a modification form, partly in section and partly in elevation, Figure 9 being a section on the line 9—9 of Figure 8.

In order that the principle of the present invention may be clearly understood, attention is first directed to Figures 1 and 2 in connection with which this principle will be first explained.

In Figure 1, I designates a shaft adapted to be driven by the crank shaft of an internal combustion engine or any other suitable prime mover adapted to deliver power. When driven by an engine of a vehicle a manually operable clutch is preferably interposed between the crank shaft and the shaft I. On this shaft I is fixed a disk 2 shown in this figure as substantially flat, but positioned in a plane in angular relation to the normal cross axial plane of the shaft. For example, the dash lines 3 of Figure 1 indicate a normal cross axial plane intersected by the axis of the shaft I, while the double dot and dash lines indicate a plane in angular relation to the plane 3, but intersecting the axis of the shaft I at the same point. The disk 2 is positioned in the plane 4, so that, as the shaft is rotated, the disk 2 may be said to gyrate rather than merely rotate upon an axis normal to its opposite faces, although I shall refer to this movement as one of rotation.

The two opposite faces of said disk therefore constitute, in effect, camming surfaces which are adapted to operate upon followers, mounted against conjoint rotary movement. These followers, designated 5, are preferably arranged in pairs of opposite sides of the disk and there may be as many of these pairs of followers as desired.

In any event the followers of each pair are mounted in holders 6 which are, in turn, mounted for radial adjustment upon yokes 7 straddling the disk at different points in its periphery. The yokes are mounted for reciprocating movement parallel to the axis of the shaft 1, but are secured against rotation with the disk, so that the legs of the yokes always extend radially of the disk and in definite radial planes. Consequently when the shaft 1 is rotated to rotate the disk 2, the followers will cause reciprocation of the yokes in a direction parallel to the axis of said shaft.

Secured to each of the yokes is an operating rod 8 which extends toward the rear of the vehicle and is provided with teeth 9 so that these operating rods constitute racks, guided in appropriate bearings for purely rectilinear movement. With these racks are adapted to cooperate a plurality of gears. In Figure 1 these gears are shown as arranged in pairs consisting of gears 10 and 11. The gears 10 are the "forward" gears, i. e., the gears which, when operated, will impart forward movement to the vehicle, while the gears 11 are the "reverse" gears. The gears 10 and 11 are spaced apart at least the width of the racks 9, so that when the racks occupy this intermediate spacing, there will be no connection between the racks and the gears and a "neutral" condition will result. Of the gears 10 and 11, one pair is adapted to cooperate with each rack and there are as many pairs of gears as there are racks.

Each gear comprises a toothed peripheral annulus 14' and a core 14, forming between them a ratchet similar to an overrunning clutch. By preference, I employ a ball ratchet, such as the common type of ball ratchet shown in Figure 2, so that, when the gear 10 in this figure is rotated counterclockwise, the annulus 14' of the gear will cause the ratchet balls 12 to be gripped between the inclined surfaces 13 of the core 14 of the ratchet and the inner periphery of the annulus 14', so that the core will be driven by the ratchets are reversed so as to provide for 10 is shown in Figure 2, while in the gears 11, the ratchets are reversed so as to provide for a "reverse" drive. With this arrangement, the operating rods 8 will drive the forward gears by a pushing operation and the reverse gears by a pulling operation. The core 14 of the several ratchets is common to all of the gears and is secured by a key 15 to a sleeve 16, so as to be slidable thereon and passing through the interior of the sleeve 16 is a polygonal stub shaft 17.

At about the center of the ratchet core 14 and between the contiguous gears 10 and 11, is arranged a pair of spaced apart fixed collars 18 between which extends a gear shifter 19. Through any suitable connections to an operating lever within easy access of the driver of the vehicle, this shifter may be moved parallel to the axis of the stub shaft 17 to shift all of the gears longitudinally of said shaft in order to bring the gears 10 into mesh with the operating rods 8 or the gears 11 in mesh with said operating rods or to move said gears into the aforesaid neutral position.

One of the outboard ends of the stub shaft 17 may be connected to the main gear or pinion or a conventional automobile rear wheel differential, but with this construction, a differential is not necessary. As shown in Figure 1, the opposite ends of the stub shaft may be connected to universal joints 20 which are, in practice, connected to the rear wheel axles of a vehicle. With this construction, these rear wheel axles may be made relatively short. Moreover, the universal joints 20 may be, if desired, connected to the driving gears of a chain drive to the rear wheels. Various other kinds of connections may be made between the stub shaft and the rear wheels in order to drive the latter and the invention is not limited to any particular driving connections for this purpose.

When the system shown in Figure 1 is in operation, the rotation of the disk 2 by the engine will bring about a definite throw of the operating rods 8 parallel to the axis of the disk, depending upon the distance of these followers from the axis of gyration of such disk. For example, if the followers are near the periphery of the disk, the throw will be at the maximum and the angular movement of the gears 10 or 11 will be correspondingly great for each operation of the operating rods. However, as the followers are moved toward the axis of the disk, the throw will be correspondingly lessened until directly adjacent the axis of the disk the throw will be practically negligible. Furthermore, as the throw decreases, the leverage increases so that the greatest power is transmitted with a lesser throw and with consequent lower speed and the lesser power is transmitted with a greater throw and a greater speed.

It is of course possible to bring about this change in power and speed transmission in a manual manner by manually moving the followers radially of the disks to suit load requirements. However, this invention provides that this operation be automatic and the means whereby this may be accomplished is shown in the more detailed disclosure of Figures 3 and 5. These figures show the mounting of the tie yokes 7 for reciprocating movement while maintaining them against rotation with the shaft 1. Here each of the yokes is supported on two guides 21 and 22 which slidably pass through fixed bearings 23 and to maintain these yokes from rotating on the axes of their guides, a fixed slide 24 coacts with each yoke by extending between flanges 25 on the yoke, as shown best in Figures 3 and 5. The guides 22 are made somewhat larger than the guides 21 and are counterbored or recessed to form within them cylinders in each of which is positioned a piston 26. The operating rods 8 are secured to these pistons and at each side of the piston is shown a spring 27 to cushion the operations between the yokes and the operating rods. In lieu of these springs or either of them, air may be pocketed to function as an air cushion for the same purpose.

The followers 5 are shown in the form of antifriction bearings, such as ball bearings, held within the sockets of the holders 6 and these holders are guided, as shown best in Figures 4 and 5, in slots 28 formed in the radial portions of the yokes, so that the holders are adapted for radial sliding movement within these slots.

Extending radially of the yoke through each slot is a threaded spindle 29, the opposite ends of which are journalled in the yokes at the opposite ends of the slots 28 and these threaded spindles have threaded engagement with the holders 6. On the outer end of each spindle is a beveled pinion 30 meshing with a beveled pinion 31 on a stub shaft 32, also mounted for rotation in the yoke and each shaft 32 is extended and connected by a flexible cable 33 to a worm wheel 34. These worm wheels mesh with a worm 35 either directly fixed or geared to the shaft of an electric motor 36. When the motor is operated, the worm 35 driven thereby will simultaneously impart rotation to both flexible shafts 33 and through the shafts 32 and the gears 31 and 30, this rotation will be imparted to the threaded spindles 29 to cause travel of the follower holders 6 in directions radially of the disk 2. The gearing and threaded connections between these several parts is such that each pair of followers will move radially inwardly or outwardly at the same speed and in corresponding directions, so that, when one pair of followers is moved toward the shaft 1, the other pairs of followers will be similarly moved, and, conversely, when one pair of followers is moved radially outwardly, all pairs will be moved in a like manner.

The motor 36, which brings about this shifting of the followers radially of the disk 2, is of the reversible type and is connected by means of an appropriate wiring system, diagrammatically shown in Figure 1, to a reversing switch embodying fixed contacts 37 and 38 and a movable contact 39, the latter of which is insulated from and operated by a frame 40 secured to the movable collar 41 of a ball governor 42. The ball governor is secured to the shaft 1 or a geared countershaft and is operated thereby, so that the position of the balls of the governor is controlled by the speed of the shaft, which, is, in turn, controlled by the load on the engine.

Suppose, for example, that the vehicle is at rest with the followers at the terminals of their inward radial travel, with the clutch connecting the engine crank shaft to the shaft 1 disengaged. The shaft 1 will be at rest. If the engine is started, and the clutch engaged, the shaft 1 will immediately start to rotate at the engine speed, but the followers, being in engagement with the central flat portion of the disk, will not impart any movement to the rear wheels. As the engine picks up speed, the ball governor will operate to shift the movable contact 39 into engagement with the fixed contacts 37 and immediately the motor 36 will be energized and operate through the flexible shafts 33 to move the followers 5 in an outward radial direction and on to the cam-like portion of the disk 2. As the followers contact the cam-like portion, yokes 7 will be reciprocated, first with a relatively short throw, because of the correspondingly short throw of the disk adjacent its flat central portion.

As the rods 38 are thus reciprocated, the rear wheels will be driven through the ball ratchets and as the load is placed on the engine, its speed will be held down until the car picks up momentum sufficiently to permit the engine to gain speed. If the load is too great for the engine under the particular location of the followers radially of the disk 2, the shaft 1 will be slowed down by the load and the movable contact engaged with the other fixed contacts 38 to move the followers 5 sufficiently nearer to the shaft 1 that the engine can carry the load and drive the car. As the engine takes hold of the load and picks up speed, the governor will again shift the movable contact 9 into engagement with the fixed contacts 37 and the followers 5 will be moved further outwardly by the motor 36. In this way the ability of the engine to carry the load will cause a progressive movement of the followers in an outward radial direction until the car is traveling at full speed with the engine well able to carry the load. At this time the followers will arrive at the termini of their outer radial movement.

If some means were not provided to the contrary, the electric motor 36 might continue to operate, under certain conditions, when the followers had reached one or the other termini of their travel and I therefore provide suitable means to preclude jamming of the parts which might result from such a condition. Various means may be employed for this purpose. However, in Figure 3 I have shown one illustrative form of construction.

In this showing the flexible shafts are connected to the worm wheel 34 by connectors shown at 43. One of these connectors 43 is provided with a gear meshing with a pinion 62 and this pinion is fixed on a short spindle 63 threaded to correspond with the threads of the spindles 29, so that a switch opener 64 threaded on to the spindle 63 will operate in synchronism and for substantially the same distance as said followers with respect to their travel on the spindles 29.

At distances apart approximately equal to the length of the spindles 29 are fixed electrical contacts 65 and 66 with which are associated resilient contacts 67 and 68, respectively, which project into the path of the spring opener 64. The switches formed by the contacts 65—67 and 66—68 are included in the corresponding leads of the circuit which controls the operations of the motor 36, so that by this arrangement, when the follower holders reach the outer terminus of their travel, the circuit which has energized the motor to bring about this result is automatically broken by engagement of the switch opener 64 with either of the contacts 67 or 68, as the case may be, and it is held open until the lowering or increase of the motor speed, as may be the case, will permit it to close. In this way I guard against overtravel of the holders 6 on the spindles 29.

In the structure of Figure 1 the disk 2 is shown as inclined but substantially planetary. In the construction of Figure 3, this disk is shown as of the same form but with a flat central portion 2a, normal to the axis of shaft 1. In the construction of Figures 6 and 7 the disk is shown as having an undulating peripheral portion merging into a substantially flat central portion. In the particular showing of these latter figures, each face of the disk has three distinct high radii and three distinct low radii. Between high and low radii, the disk is undulated from a lesser to a greater degree in an outward radial direction, so that each follower receives three distinct impulses in each direction axially of the shaft during each complete rotation of the disk, here designated 2'. In carrying out this invention I may use a disk of the undulating character described with its plane of symmetry normal to the axis of the shaft 1 or I may use either of the other two forms described interchangeably in various constructions embodying this invention. Similarly I may employ any appropriate number of yokes and pairs of followers which may be desired. Thus, in Figures 1 and 3, I have shown two yokes positioned at 180 degrees, whereas in Figures 6 and 7, I have shown three yokes positioned at 120 degrees apart about the axis of the shaft 1. Furthermore these latter figures show pneumatic power applying devices which will next be described.

Referring to Figures 6 and 7, the yokes 7 have attached to the opposite sides thereof pistons 45, operating within cylinders 46 and these pistons and cylinders are adapted to function as pumps, to pump air through inlet valves 47 and outlet valves 48 to a pressure dome 49 from which the pressure is fed through a control valve 50 to a turbine 51. The turbine 51 drives through gearing connections, shown as a worm 52, to a worm wheel 53 which has a long hub 54. On this long hub is splined a movable gear 55 adapted to be moved by a manually controlled shifter 56, to engage with a forward gear 57, as shown in full lines in Figure 6, or with an intermediate gear 58, as shown in dotted lines in this figure. The idler 58 meshes with the reverse gear 59 and this reverse gear drives the stub shaft 17' which is connected through universal joints 20 to the rear axles of the car. The valve 50 is preferably connected to the brake pedal 60 and the pressure dome 49 has a pressure relief valve 61.

When this apparatus is in operation, the disk 2' serves to operate the several pumps to supply air under pressure to the pressure dome 49 and from this pressure dome compressed air is supplied to the turbine 51 to drive the same and thus drive the rear axles. If the gear 55 is in engagement with the gear 57, forward movement will be imparted to the car. If it is in engagement with the gear 58, reverse movement to the car will be transmitted. If it is in an intermediate position, it will engage with neither of these gears and the car will remain at rest even though the turbine continues to operate. In order to control the supply of compressed air to the turbine, the valve 50 is connected to the brake pedal 30, so that, when the brake is applied, the valve 50 is shut off and compressed air will not be fed to the turbine. Excess pressure which may be built up in the pressure dome 49 by continued operation of the pumps, will be relieved through the safety valve 61. This latter system is a very simple system, but will provide a very smooth application of power to the rear wheels.

In Figures 8 and 9 I have shown a further modified form of construction embodying the invention. In all of the prior figures the driving shaft from the prime mover serves to operate a disk. In the construction of Figures 8 and 9 the transmission embodies a cone 71 with an undulating camming surface. In these figures, 1a designates the shaft which is driven from the prime mover. A portion of this shaft is squared as indicated at 69, and at this squared portion of the shaft is mounted a sleeve 70, which is fixed to the shaft against longitudinal movement. On this sleeve the cone 71 is mounted for sliding movement, but is locked against rotation by a spline 72. The rear end of the sleeve 70 beyond the large end of the cone has rigid therewith a clutch element 73.

The undulating cross section of the cone is shown best in Fig. 9. Any desired number of these undulations may be provided, but as shown there are six high points and six low points which merge into one another to form six camming surfaces which taper gradually from the larger to the smaller end of the cone, so that the amplitude of the camming surfaces increases in the direction of the larger end of the cone.

The cam 71 is adapted to act upon followers 5a mounted to reciprocate with holders 6a which are formed at the ends of the power arms of bell crank levers 74. Springs 80 maintain the followers in contact with the cone. Levers 74 are mounted on fixed pivots 75 and the ends of their work arms are connected to operating rods 8a of substantially the construction of the operating rods 8 and they are adapted to cooperate with ball ratchets 10a of the same construction shown in Figure 2.

The ball ratchets 10a are mounted on a sleeve 76, slidable on a square stub shaft 77 and this sliding movement is adapted to be imparted with a manually operable slider 78 which projects into convenient position adjacent the operator. The forward end of the sleeve carries a clutch member 79 adapted to cooperate with the clutch member 73.

Associated with the shaft 1a is a ball governor 42a, having a movable member 41a which controls a movable switch member 39a cooperating with fixed switch members 38a and 37a. The parts 37a, 38a and 39a correspond to the parts 37, 38 and 39 and are arranged in the circuits of a reversible motor 36a in the same manner as illustrated in Fig. 3. This motor serves to drive a threaded shaft 80 and on this shaft is mounted a cone shifter 81, so that through the operation of the motor 36a, under control of the governor, the shifter 81 is moved longitudinaly of the threaded shaft 80 to move the cone longitudinally of the shaft 1a and vary the throw of the followers and consequent throw of the operating rods 8a with like control of the speed of the vehicle. To preclude overtravel of the cone in either direction, under the impulse of the motor, breaking switches are included in the motor control circuits in the same manner and for performing the same functions as illustrated and described in connection with Figure 3.

In Figure 8 the parts are positioned for low speed forward drive. As the engine speed picks up under the load, the cone will be moved to the left in this figure to increase the throw of the operating rods 8a and increase the speed of the vehicle. If the operator moves the shifter 78 to the left, just sufficiently to disengage the gears of the ball ratchets 10a from the operating rods 8a, (limiting guides 82 precluding conjoint movement of the operating rods), then the ball ratchets will be disengaged from the operating rods and the shaft 77 will be no longer driven from the shaft 1a. However, if the sleeve 76 is shifted still further to the left, i. e., sufficiently to engage the clutch members 78 with the clutch member 73, then the shaft 77 will be coupled for direct drive to the shaft 1a and the arrangement is such that this direct drive will constitute reverse. For this purpose the ball ratchets are so arranged as to drive only in a "forward" direction, whereas the direct drive is contra and constitutes "reverse."

I have shown, for the purpose of diagrammatic illustration in Figure 8, an ordinary cone clutch, but, in practice, I preferably employ the well known planetary gear clutch, but either a cone clutch or a disk clutch will work in this connection although not as efficiently as a planetary gear clutch.

The power take-off from the shaft 77 may be through any appropriate means, a universal joint 83 being shown for the purpose of graphic illustration. Also for the purpose of illustration I have shown only two followers 5a in the construction of Figures 8 and 9, although I preferably use three or more followers, arranged equidistantly about the periphery of the cone as this gives a more smooth and even drive with adequate power output.

The foregoing detailed description sets forth the invention in different illustrative forms but the invention is to be understood as fully commensurate with the appended claims.

Having thus fully described the invention, what I claim as new and desire to secure by Letters Patent is:

1. A power transmission system comprising a driving shaft, a cam mounted on the driving shaft and having cam surfaces of progressively greater amplitude in a direction away from the axis of said shaft, a plurality of yokes radially straddling said cam and guided for rectilinear reciprocation parallel to the axis of the shaft while held at all times at a predetermined fixed distance from said shaft, at least one follower carried by each yoke and adjustable thereon radially of the shaft to engage the cam at different distances from the axis of rotation of said shaft, means automatically controlled by the speed of said shaft for automatically adjusting the followers radially of the cam, and a power take-off connected to each yoke.

2. A power transmission system comprising a driving shaft, a cam disk mounted on said shaft and having cam surfaces of progressively greater amplitude in a direction away from the axis of said shaft and in the form of at least three arculately undulating sectors successively arranged about the axis of said shaft, at least three yokes extending radially of and straddling said disk in equally spaced angular relation about the disk and mounted for reciprocation in a direction parallel to the axis of said shaft, followers carried by said yokes and engaging with the cam surfaces of the disk to reciprocate the yokes as the disk is rotated, and means automatically controlled by the speed of the driving shaft to automatically adjust the followers on the yokes radially of said disk, in combination with a driven shaft, and a power take-off connected to each yoke.

3. A power transmission system comprising: a driving shaft, a cam mounted on the driving shaft and having cam surfaces of progressively greater amplitude in a direction away from the axis of said shaft, at least one yoke straddling said cam and having guides for limiting said yoke for movement only in the nature of reciprocation along a rectilinear path parallel to the shaft, at least one follower carried by the yoke for adjustment on the yoke in a direction normal to the axis of its reciprocatory movement, said follower engaging the cam for the purpose of reciprocating the yoke when the shaft is rotated, means controlled by the speed of said shaft for automatically adjusting the follower in a direction normal to the axis of reciprocation of the yoke, and a power take-off connected to the yoke.

RENE GOUIRAND.

REFERENCES CITED

The following references are of record in the file of this patent:

UNITED STATES PATENTS

| Number | Name | Date |
|---|---|---|
| 1,591,256 | Zanella | July 6, 1926 |
| 1,863,598 | Jarman | June 21, 1932 |
| 1,929,185 | Ferris | Oct. 3, 1933 |
| 306,152 | Harding | Oct. 7, 1884 |
| Re. 21,410 | Small et al | Mar. 26, 1940 |
| 2,008,231 | Vincent | July 16, 1935 |
| 2,213,978 | Cory | Sept. 10, 1940 |
| 1,157,415 | Norton | Oct. 19, 1915 |
| 1,159,612 | Sundh | Nov. 9, 1915 |
| 960,575 | Negley | June 7, 1910 |
| 2,194,316 | Messinger | Mar. 19, 1940 |
| 984,688 | McCarty | Feb. 21, 1911 |
| 1,931,543 | High | Oct. 24, 1933 |
| 2,370,710 | Blair | Mar. 6, 1945 |
| 1,852,897 | Price | Apr. 5, 1932 |
| 900,342 | Ashley | Oct. 6, 1908 |
| 1,043,480 | Sundh | Nov. 5, 1912 |

FOREIGN PATENTS

| Number | Country | Date |
|---|---|---|
| 447,033 | France | Oct. 17, 1912 |